United States Patent [19]

Genuit

[11] Patent Number: 4,569,009

[45] Date of Patent: Feb. 4, 1986

[54] SWITCHING REGULATOR HAVING A SELECTABLE GAIN AMPLIFIER FOR PROVIDING A SELECTIVELY ALTERABLE OUTPUT VOLTAGE

[75] Inventor: Luther L. Genuit, Scottsdale, Ariz.

[73] Assignee: Honeywell Information Systems Inc., Phoenix, Ariz.

[21] Appl. No.: 586,460

[22] Filed: Mar. 5, 1984

[51] Int. Cl.[4] .......... H02M 3/315

[52] U.S. Cl. .......... 363/28; 323/280; 323/285; 363/57

[58] Field of Search .......... 363/28, 57; 323/280, 323/272, 281, 282, 276, 285

[56] References Cited

U.S. PATENT DOCUMENTS

| | | | |
|---|---|---|---|
| 3,573,597 | 4/1971 | Genuit | 363/28 |
| 4,001,667 | 1/1977 | Bober | 323/282 |
| 4,323,959 | 4/1982 | Check | 363/28 |

FOREIGN PATENT DOCUMENTS

| | | | |
|---|---|---|---|
| 838689 | 6/1981 | U.S.S.R. | 323/282 |

OTHER PUBLICATIONS

Hyland, "Constant Current Source," IBM Tech. Discl. Bul., vol. 13, No. 8, pp. 2367, 2368, Jan. 1971.

Sun, "The Digital Control of D.C. Power Sources," Journal of the Chinese Inst. of Eng., vol. 2, No. 1, pp. 67–72, Jan. 1979.

*Primary Examiner*—William H. Beha, Jr.

*Attorney, Agent, or Firm*—A. A. Sapelli; J. S. Solakian

[57] ABSTRACT

A power supply for providing a selectable predetermined regulated output voltage. A switching regulator circuit provides the conversion of an input voltage to a DC output voltage and a control circuit, which senses the output voltage, controls the conversion of the switching regulator circuit. In the present invention, an amplifier, having selectable gain values, is interposed in the feedback loop, i.e., between the output terminal of the power supply and the control circuit. Thus a predetermined portion of the output voltage is fed back to the control circuit, thereby selectively determining the output voltage without necessitating changes to the switching regulator circuit or the control circuit.

4 Claims, 4 Drawing Figures

1

SWITCHING REGULATOR HAVING A SELECTABLE GAIN AMPLIFIER FOR PROVIDING A SELECTIVELY ALTERABLE OUTPUT VOLTAGE

BACKGROUND OF THE INVENTION

The present invention relates to power supplies, and more particularly, to power supplies for outputting a preselected one of a plurality of regulated DC output voltages.

In many electronic systems, and in particular in data processing systems, there is always the need for providing regulated DC voltages to the logic of the system. Specifically, the power requirements generally include providing a plurality of voltage levels. For the sake of economics in manufacturing, field spares, . . . , it is desirable to have one power supply assembly that is operable over all the required voltages. The power stage of a power supply, or sometimes referred to as a switching regulator, is generally adaptable to such versatility. In present existing power supplies, the output voltage of a switching regulator is sometimes modified through the use of resistive voltage dividers in an output voltage sensing circuit. By feeding back a selected portion of the output voltage, it is possible to increase the output voltage over that obtained when the full output voltage is fed back. However, it is not possible to reduce output voltage below the initial design value by this method. The control circuit associated with the power supply is not always readily adaptable, especially at low output voltages. Switching regulator type power supplies regulate the output voltage by comparison with a fixed reference voltage. Thus, it is possible to alter the control circuit in a number of ways to obtain different values of regulated voltage. The obvious approach is to change the reference voltage to the desired value. However, in existing power supplies this is generally not feasible. In the typical implementation of a control circuit, ther is included a number of integrated circuits that utilize the sense voltage, i.e., the output voltage, as a supply or source voltage. These circuits may not be operable from such lower source voltages. The same applies to circuit elements incorporated in an over-voltage protection circuit, and in other "housekeeping" circuits such as under-voltage detection circuits, etc. Furthermore, if a regulator is to be selectively operable at more than one output voltage, all such circuitry must be modified by a variety of means, including switches, connectors, jumpers, . . . .

Therefore, there exists a need to provide a power supply which can provide one of a plurality of regulated output voltages, the regulated output voltage being selectable without requiring extensive circuit design changes or numerous changes in component values. The power supply of the present invention adds a selectable gain amplifier to the power supply feedback loop. The selectable gain amplifier of the preferred embodiment is provided with a plurality of feedback resistors and elements for selectively connecting them into the amplifier circuit thereby varying the gain of the amplifier.

SUMMARY OF THE INVENTION

Therefore, there is provided by the present invention a power supply, having an output terminal adapted to transmit a predetermined regulated voltage level which comprises a switching regulator power stage element, operatively connected to the output terminal, for converting an unregulated input voltage to a regulated DC output voltage. A selectable gain amplifier element, operatively connected to the output terminal, provides a control signal, the control signal being a preselected factor of the predetermined regulated voltage level. A control circuit element, operatively connected to the switching regulator power stage element, and further, operatively connected to the selectable gain amplifier element, controls the DC output voltage in response to the control signal such that the regulated DC output voltage corresponds to the predetermined regulated voltage level.

Accordingly, it is an object of the present invention to provide a power supply.

It is another object of the present invention to provide a power supply having selectable regulated output voltages.

It is still another object of the present invention to provide a power supply having selectable regulated output voltages without requiring circuit changes.

It is still a further object of the present invention to provide a power supply having selectable regulated output voltages without requiring circuit component value changes.

It is still a further object of the present invention to provide a power supply having selectable regulated output voltages without requiring extensive design changes or numerous changes in component values.

These and other objects of the present invention will become more apparent when taken in conjunction with the following description and attached drawings, wherein like characters indicate like parts, and which drawings form a part of the present application.

DETAILED DESCRIPTION

Figure 1:
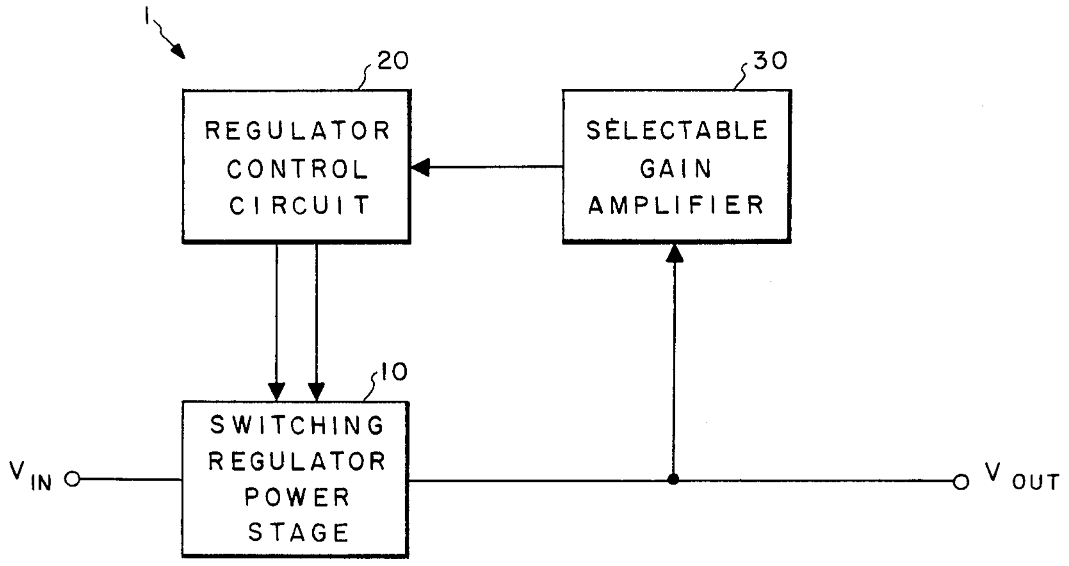
FIG. 1 shows a functional block diagram of the preferred embodiment of the present invention.

Referring to FIG. 1, there is shown a functional block diagram of the power supply of the preferred embodiment of the present invention. The power supply is also referred to herein as a switching regulator.

A switching regulator power stage 10 performs the basic AC-to-DC or DC-to-DC conversion, that is a conversion of $V_{in}$ to $V_{out}$, respectively, wherein $V_{in}$ of the preferred embodiment is an unregulated DC input voltage and $V_{out}$ is the regulated DC output voltage. (If $V_{in}$ is an AC voltage, a rectifier can be included in an input lead effectively yielding an unregulated DC input.) The switching regulator power stage 10 utilizes a plurality of silicon controlled rectifiers (SCRs) and a plurality of reactors in which sequential overlapping operation is provided. A regulator control circuit 20 is provided for firing the SCRs singly and individually at uniform intervals of time thereby applying current pulses from an input circuit through each of the reactors separately.

Regulator control circuit 20 (also referred to herein as a control circuit) provides a plurality of control signals, each one associated with a corresponding SCR and in a sequence relating to the energy storage and discharge periods of the reactors such that an input current pulse can be provided to each of the plurality of reactors at a time while another reactor is discharging stored energy thereby resulting in overlapping current pulses being delivered by the secondary windings of at least two reactors. The average output current is therefore, the summation of transferred current pulses through the plurality of reactors.

Overlapping of current pulses has the effect of increasing the duty cycle of the output current pulses thereby reducing RMS ripple currents in the output circuit. The SCRs are fired individually and sequentially such that a next reactor can be receiving an input current pulse while the reactor responding to a previously fired SCR is still transferring stored energy into a corresponding secondary winding. The regulator control circuit 20 controls the firing rate of the SCRs as required to regulate the output level, or output voltage, $V_{out}$. Firing rate will therefore vary with the loading of the switching regulator, the variation being determined by a portion of the $V_{out}$ signal fed back to the regulator control circuit 20 through a selectable gain amplifier 30. By varying the gain of the selectable gain amplifier 30, a varying factor, i.e., portion or multiple, of the $V_{out}$ signal is fed back to the control circuit 20, thereby causing $V_{out}$ to be regulated to a preselected value, the preselected value of $V_{out}$ being related to a preselected value of the gain of the selectable gain amplifier 30.

Figure 2:
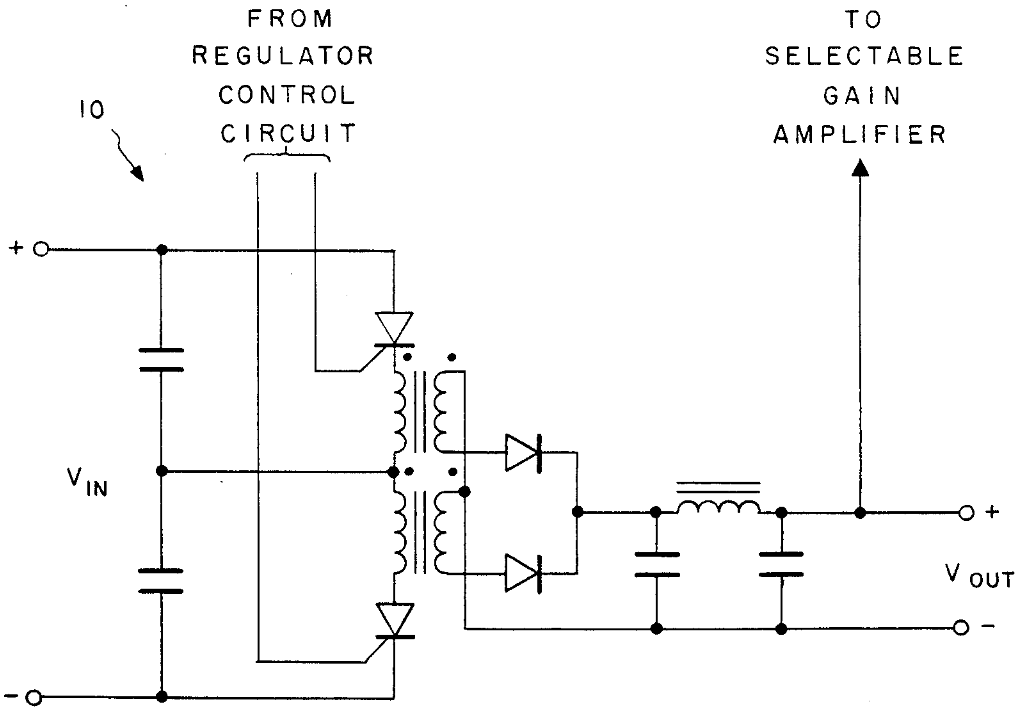
FIG. 2 shows a schematic of a switching regulator power stage utilized in the preferred embodiment of the present invention.

Referring to FIG. 2, there is shown a schematic of the switching regulator power stage 10 utilized in the preferred embodiment of the present invention. The switching regulator power stage 10 is more fully described in U.S. Pat. No. 3,573,597, which is incorporated by reference herein.

Figure 3:
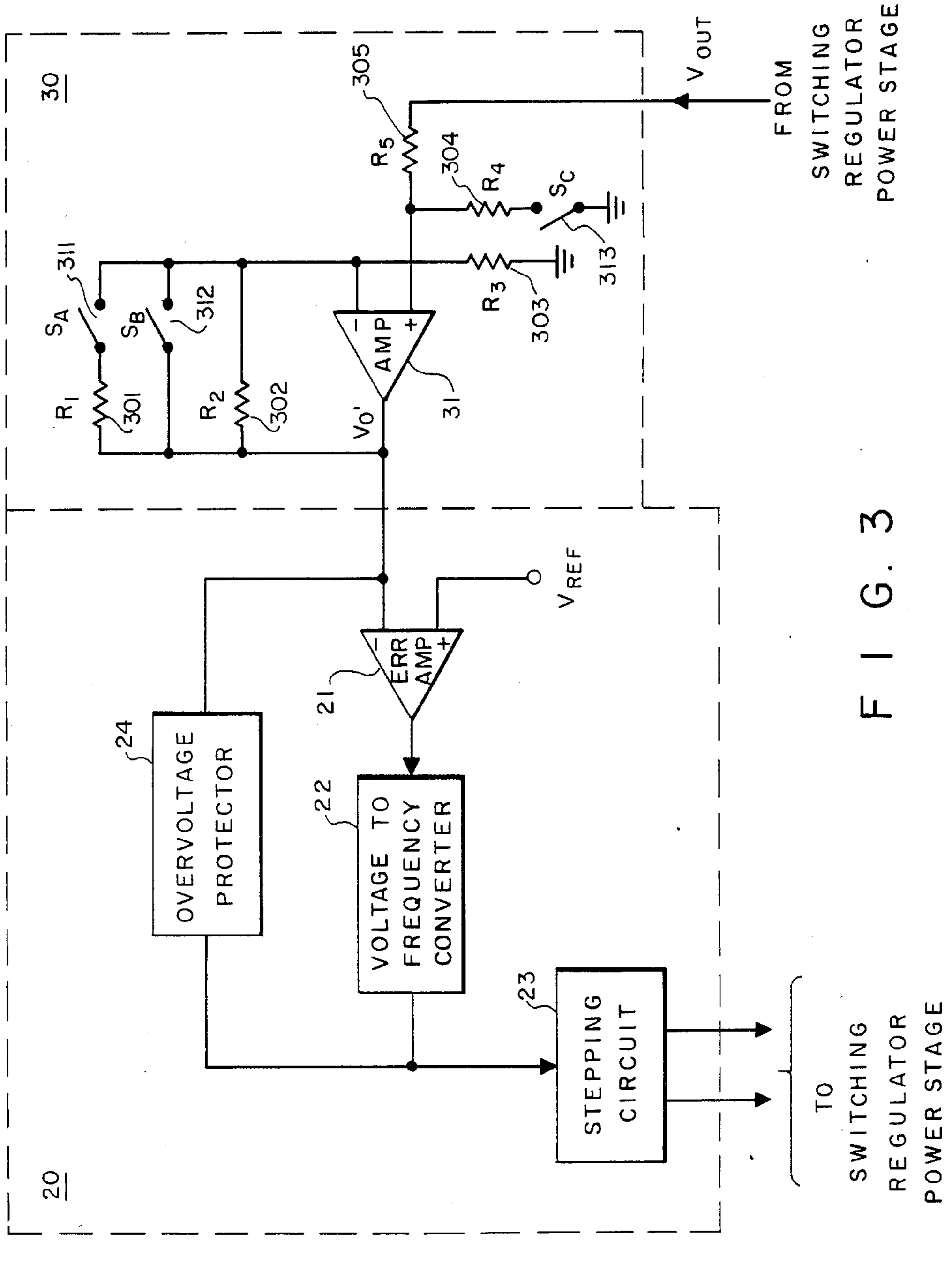
FIG. 3 shows a logic block diagram of a regulator control circuit and a selectable gain amplifier of the preferred embodiment of the present invention.

Referring to FIG. 3, there is shown a logic block diagram of the regulator control circuit 20 and the selectable gain amplifier 30 of the preferred embodiment of the present invention. The control circuit 20 comprises an error amplifier (ERR AMP) 21, a voltage-to-frequency converter 22, and a stepping circuit 23. An over-voltage protector circuit 24, and other "housekeeping" circuits, such as an under-voltage detection circuit, over-current detection circuit, . . . (not shown), can be included in the control circuit 20. The ERR AMP 21 compares a predetermined portion or multiple of the switching regulator ouput voltage ($V_o'$) to a reference voltage $V_{ref}$, and delivers an error voltage to the voltage-to-frequency converter 22. The voltage-to-frequency converter 22 generates a train of trigger pulses with a repetition rate that is proportional to the error voltage. The stepping circuit 23, also referred to as a gating circuit, directs each pulse to the appropriate SCR, the first pulse going to SCR 1, the second pulse going to SCR 2, the third pulse going to SCR 1, . . . . The control circuit 20 is of a type more fully described in U.S. Pat. No. 4,323,958 and is incorporated by reference herein. The over-voltage protector 24, which can be utilized in the control circuit 20, is of a type more fully described in U.S. Pat. No. 4,045,887, which is incorporated by reference herein.

The selectable gain amplifier 30 comprises a differential amplifier (AMP), which can be an integrated circuit chip LM10, and a network of input and feedback resistors. The input resistors includes resistor 305 ($R_5$) and resistor 304 ($R_4$), and the feedback resistors include resistor 301 ($R_1$), resistor 302 ($R_2$), and resistor 303 ($R_3$). The resistors can be selectively connected to the network of the selectable gain amplifier 30 by means of switch 313 ($S_c$), switch 312 ($S_b$), and switch 311 ($S_a$). For any given set of switch conditions, the gain of the selectable gain amplifier 30 will be fixed at some preselected value, which in turn selects the portion or multiple of $V_{out}$ which is coupled to ERR AMP21. The resistor and switch network of the preferred embodiment of the present invention is designed to permit four different regulated voltages.

The four voltage levels incorporated into the preferred embodiment of the present invention are +5.0 V, −5.2 V, −3.3 V, and −2.0 V. The value of $V_{ref}$ is 5.0 V. The values of the resistors R1 through R5 are selected to yield a gain of the AMP 31 as shown in Table 1.

TABLE 1

| GAIN | $V_{OUT}$ | $S_A$ | $S_B$ | $S_C$ |
|---|---|---|---|---|
| 2.5 | $-2.0^V$ | OPEN | OPEN | OPEN |
| 1.515 | $-3.3^V$ | CLOSED | OPEN | OPEN |
| 1.0 | $+5.0^V$ | OPEN | CLOSED | OPEN |
| .96 | $-5.2^V$ | OPEN | CLOSED | CLOSED |

The function of the selectable gain amplifier 30 in the determination of the regulated DC output voltage signal may be further clarified by way of example.

Referring first to FIG. 3 and recalling that in the preferred embodiment the reference voltage, $V_{REF}$, is set at five volts, the action of the error amplifier 21 is to control the voltage-to-frequency converter 22 in such a manner as to equalize the voltage levels at its own input terminals, i.e., in a manner as to cause the voltage at its inverting input terminal (−) to approach the five volt level, $V_{REF}$, that is present at its non-inverting input terminal (+). The repetition rate of the firing signals delivered to the SCRs will thus be automatically adjusted by the control circuit 20 to a value that produces a voltage level $V_0'$ approaching five volts. If the gain of the selectable gain amplifier is set at unity (by closing switch $S_B$), the output signal $V_0'$ of AMP 31 will match its input signal which is the regulator output voltage $V_{OUT}$. An output voltage of five volts will thus be delivered by the switching regulator power stage 10. If, on the other hand, the gain of the selectable gain amplifier 30 is set at 2.5 by opening switches $S_A$, $S_B$, and $S_C$, the realization of a five volt value for $V_0'$ requires a value of $V_{OUT}$ equal to 2.0 volts, and the output voltage of the switching regulator power stage 10 will in this case be automatically adjusted by control circuit 20 to 2.0 volts. In a similar fashion, the value of $V_{OUT}$ resulting from any gain setting of AMP 31 will be such as to produce a value of $V_0'$ approaching the value of $V_{REF}$ (5 V in the preferred embodiment).

It is now apparent that for any selected output voltage the signal $V_0'$ is always at the five volt level. The error amplifier 21, the overvoltage protector circuit 24 and other housekeeping circuits (not shown) may therefore be designed for optimum performance in connection with a five volt signal and need not be constrained to accept such lower signal voltages as 2.0 volts or 3.3 volts when such voltages are required as regulated DC output voltages of the power supply 1.

As an extension of this concept it is possible in general to alter the output voltage of a typical power supply or switching regulator by inserting in the feedback loop a fixed gain or a selectable gain amplifier of the type described herein. The resulting new output voltage will have a value that is 1/K times the original voltage where K is the gain of the fixed gain amplifier.

By connecting the lower terminals of $V_{REF}$, switch 313 ($S_c$), and resistor 303 ($R_3$), to the negative side of $V_{out}$ and then grounding the positive rather than the negative terminal of $V_{out}$, the selectable voltages are then negative rather than positive.

It will be recognized by those skilled in the art that, although the preferred embodiment of the present invention utilizes a switching regulator power stage 10, other types of DC-to-DC or AC-to-DC conversion circuits may be utilized incorporating the present invention.

Figure 4:
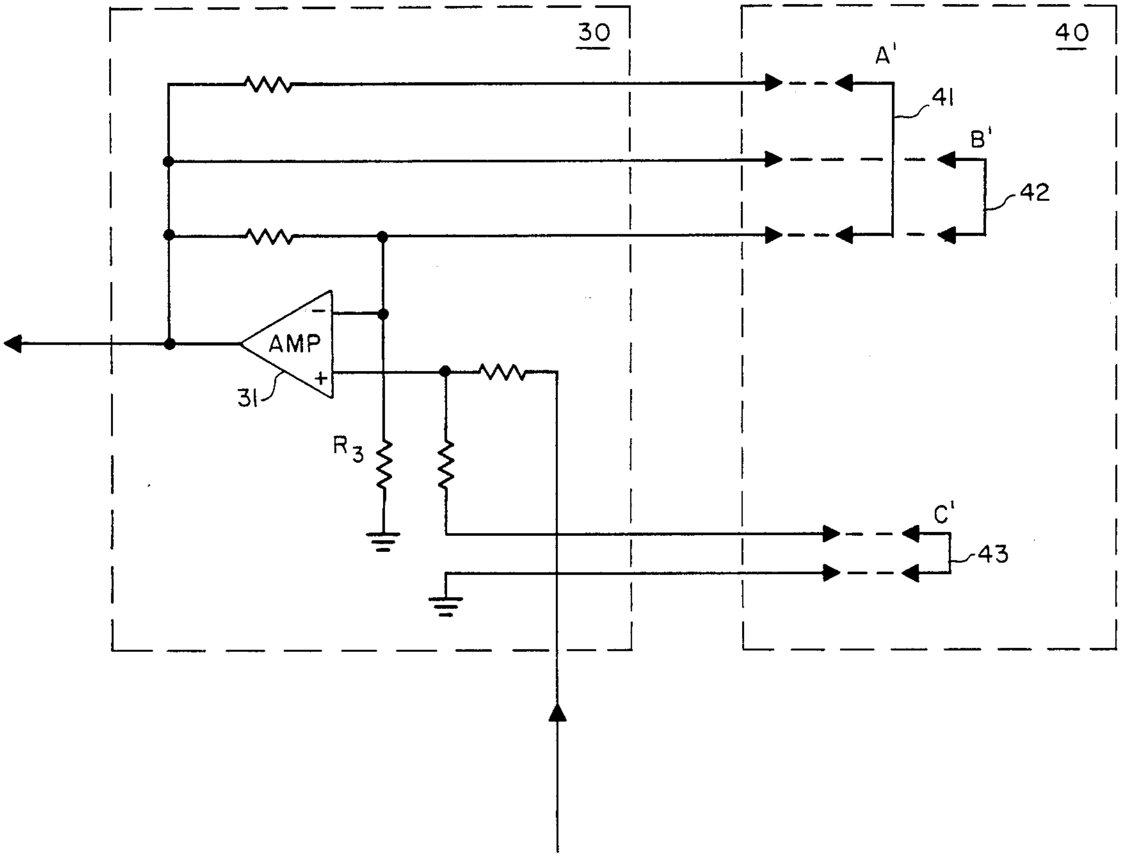
FIG. 4 shows an alternative embodiment of the selectable gain amplifier of the present invention.

Referring to FIG. 4, there is shown an alternative embodiment of the selectable gain amplifier 30. In the alternative embodiment the switches $S_A$, $S_B$, and $S_C$, are replaced with a connector 40. The connector 40 contains a combination of jumpers, including Jumper A′ 41, Jumper B′ 42, and Jumper C′ 43. In the alternative embodiment, the output voltage $V_{out}$ is determined by the jumpers present within the connector 40 as shown in Table 2. A "no" in Table 2 indicates the jumper is not present and a yes in Table 2 indicates the Jumper is present.

TABLE 2

| $V_{OUT}$ | Jumper A′ | Jumper B′ | Jumper C′ |
|---|---|---|---|
| $-2.0^V$ | No | No | No |
| $-3.3^V$ | Yes | No | No |
| $+5.0^V$ | No | Yes | No |
| $-5.2$ | No | Yes | Yes |

While there has been shown what is considered to be the preferred embodiment of the invention, it will be manifest that many changes and modifications can be made therein without departing from the essential spirit and scope of the invention. It is intended, therefore, in the annexed claims, to cover all such changes and modifications which fall within the true scope of the invention.

I claim:

1. A power supply, having an ouput terminal adapted to transmit a predetermined regulated voltage level comprising:

(a) switching regulator power stage means, operatively connected to said output terminal, for converting an unregulated input voltage to a regulated DC output voltage;

(b) selectable gain amplifier means having a plurality of selectable gain values, operatively connected to said output terminal, for providing a control signal, whereby the selectable gain value of said selectable gain amplifier means is selected to have a value such that the product of selected gain value and the predetermined regulated voltage level results in the control signal having a fixed predetermined value;

(c) control circuit means, operatively connected to said switching regulator power stage means, and further, operatively connected to said selectable gain amplifier means, for controlling the regulated DC output voltage in response to said control signal such that the regulated DC output voltage corresponds to the predetermined regulated voltage level; and (d) housekeeping circuit means, operatively connected to said selectable gain amplifier means to receive said control signal and further operatively connected to said control circuit means, for monitoring said control signal and said regulated DC output voltage to detect the presence of a condition in which predetermined monitored parameters having values outside preestablished limits results in an alarm.

2. A power supply, according to claim 1, wherein said selectable gain amplifier means comprises:

(a) amplifier means, having an input terminal adapted to receive the predetermined regulated voltage level, for modifying the predetermined regulated voltage level by the selected gain value to output the control signal; and (b) network means, operatively connected to said amplifier means, for determining the selected gain value of said amplifier means.

3. A power supply, according to claim 2, wherein said network means includes in part:

(a) switch means, for selectively connecting predetermined portions of said network means to said amplifier means, thereby selecting one of the plurality of selectable gain values of said amplifier means resulting in the control signal having a fixed predetermined value, such that said housekeeping circuit means operates over a wide range of predetermined regulated voltage levels.

4. A power supply, according to claim 3, wherein said unregulated input voltage is an unregulated DC input signal.

* * * * *